United States Patent [19]

Brunner

[11] 4,323,087
[45] Apr. 6, 1982

[54] CONTROL VALVE

[75] Inventor: Rudolf Brunner, Baldham, Fed. Rep. of Germany

[73] Assignee: Heilmeier & Weinlein, Fabrik fur Oel-Hydraulik GmbH & Co. KG, Munich, Fed. Rep. of Germany

[21] Appl. No.: 116,480

[22] Filed: Jan. 29, 1980

[30] Foreign Application Priority Data

Feb. 2, 1979 [DE] Fed. Rep. of Germany ....... 2904034

[51] Int. Cl.³ ............................................. F15B 13/04
[52] U.S. Cl. ................................ 137/625.68; 137/596; 137/625.69
[58] Field of Search ....................... 137/625.67, 625.68, 137/625.69, 596

[56] References Cited

U.S. PATENT DOCUMENTS 2,603,192 7/1952 Kensok ........................... 137/625.68
3,820,568 6/1974 Brunner et al. ................. 137/625.68

Primary Examiner—Gerald A. Michalsky
Attorney, Agent, or Firm—Kinzer, Plyer, Dorn & McEachran

[57] ABSTRACT

Control valve in which the supply channel and the consumer channel lie in one common plane, while the outlet channel cooperating with the consumer channel lies in a second plane, standing approximately perpendicular to the first plane.

8 Claims, 9 Drawing Figures

CONTROL VALVE

The invention relates to a control valve of the type referred to in the preamble to the principal claim. Such a control valve for a hydraulic system is known from German Auslegeschrift No. 2,152,830. In an embodiment for one user only the known control valve requires a first working level—related to the valve hole—on which the intake lies, a second working level, on which which a housing annular channel lies with the connection to the user or consuming device, as well as a third working level, on which the return flow connection lies with a part of the return flow duct system. The return flow connection must, in addition, be sealed off to the outside by a housing wall lying along a fourth working level. In an embodiment of this control valve for two consuming devices this valve then requires a total of seven working levels. As between the individual working levels specific intermediate distances are necessary for efficient sealing, there arises of necessity a relatively great housing length in the longitudinal direction of the valve hole. In the known control valve the design length along the longitudinal direction of the valve hole is indeed great, required as it is by the construction.

As is known, control valves of this type are used in arrangements the constructional design of which has as its object a compact construction. A reduction of the constructional length with each control valve means, therefore, in particular, if several control valves are mounted together in series, considerable space saving. In addition, there is obtained through a reduction of the constructional length with each control valve smaller expenditure in terms of manufacturing costs and materials used.

The invention has for its object to provide a control valve of the type first defined hereinabove in such a way that its housing constructional length in the longitudinal direction of the valve hole is reduced as compared with prior art.

The aim set is achieved according to the invention by means of the features mentioned in the characterising part of the principal claim.

As a result of this constructional concept the third and fourth working levels are dispensed with in a control valve for one consuming device only. This is achieved by arranging the connection to the consuming device and the return flow connection on one and the same radial plane. As compared with the known control valve, it is possible, furthermore, to dispense with the wall housing closing the return flow connection. In a control valve according to the invention which is designed for the control of two consuming devices, this saving in the length of the housing and in constructional costs is doubly felt. In this connection it is of advantage that in the operational safety of the control valve no allowances have to be made for losses.

An appropriate embodiment of the control valve according to the invention takes into account the usual maintenance, as the intake and the connection to the consuming device are disposed on opposite sides of the valve hole, and indeed staggered relative to each other. Via the pockets disposed on both sides of the piston valve and via the through boring connecting them there is obtained simultaneously an equalization of the pressure of the pressure medium prevailing through the intake relative to the piston valve. In addition, the valve hole in this construction requires no channels or recesses which are difficult to produce, but, on the contrary, it is a hole that is simple to produce, cylindrical, and ground for the purpose.

A further preferred embodiment of the subject of the application will be found in staggering between the connection to the consuming device and the return flow connection which permits designing the return flow channel as a straight boring without intersecting channels.

An appropriate embodiment of the piston valve, as usable for a further example of embodiment of the control valve according to the invention is that a circular annular groove can be made accurately as a pass on a grooving machine. The pressure medium flowing in this annular groove from the connection to the consuming unit to the return flow connection encounters an even flow path, which is very desirable especially in high pressure hydraulic installations. In addition, there takes place here also an equalization of pressure which prevents an unilateral pressing of the piston valve onto the valve hole wall.

A further appropriate embodiment of a control valve is designed for a consuming unit acted upon in an alternating manner.

According to a further preferred embodiment of the subject of the invention, particularly in a control valve arrangement, is the construction by which part of the return channel system is constructed in space-saving manner from the radial holes which go through the piston valve and also the annular grooves. The result is a simplification of the return flow system. In the neutral position of the piston valve the return flow passes over the radial holes, while in the first or second control position the annular grooves provide for a connection of the return flow channels which pass through the housing. This fact, associated with the cross-channel in each housing, assumes particular importance when the control valves are disposed in series side by side. In that case, the return flow channels form a continuous line through all the housings of the control valve arrangement and can be, at the last control valve in each particular case, connected to a return flow duct. By means of the construction according to the invention it is ensured in every case that an unimpeded through passage through the return flow system of all control valve housings is provided, irrespective of the position at any time of the piston valve in each control valve.

For as considerable as possible a reduction of the length of the housing, and also of the length of the piston slide-valve, the distance between the individual working levels is determined basically by the axial constructional length necessary for sealing, and naturally the size, seen in the axial direction, of the diameter of the holes through the piston slide-valve, and naturally also through the housing. As a result of the fact that, in the radial direction, the individual channels and holes are provided in each case in pairs and naturally with smaller diameter, a saving in the axial direction is achieved in spite of the fact that the throughflow cross-section is of the same size. Naturally, instead of the paired holes and channels, it would be possible also to provide oval holes and channels, the smaller dimension of which lies in each case in the axial direction. However, this is a rather costly design in terms of production technology.

A further appropriate embodiment of a control valve according to the invention will be found in the return flow channel system which can be produced simply in terms of manufacture. When several control valves are disposed side by side a return flow is obtained with small resistance to flowing.

An embodiment also found appropriate is to achieve with each control valve an extensive pressure release of the piston slide-valve in spite of the pressure prevailing in the return flow system, and, especially, in order not to have to accept any increase of the axial constructional length in spite of the provision of flow guiding notches.

Hereinunder a description is given of embodiments of the subject of the application diagrammatically represented in the drawing, in which.

Figure 1:
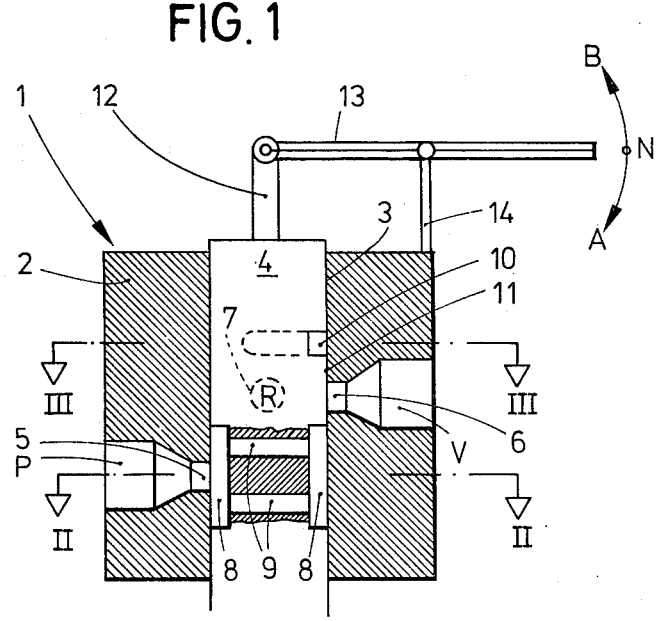
FIG. 1 is an axial section through a control valve for one consuming unit.
Figure 1A:
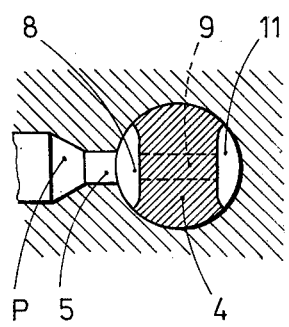
FIG. 1a is a radial section through the piston slide-valve of the control valve of FIG. 1, along a plane II—II.
Figure 1B:
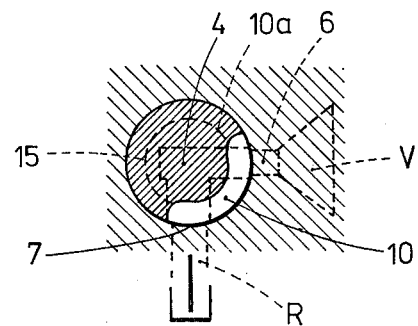
FIG. 1b is a radial section through the piston slide-valve along a plane III—III.

A control valve 1 according to FIGS. 1, 1a and 1b is intended for action upon a single consumer device V from a pump connection P. A rectangular housing 2 is, in the longitudinal direction, passed through by a cylindrical valve hole (chamber) 3 in which a piston-slide-valve 4 is displaceable. From the pump connection P an intake opening 5 leads to the valve hole 3. Diametrically opposite, and staggered relative to the intake opening 5 a consuming device connection 6 is arranged, from which the pressure medium reaches the consuming device V. Along the same radial plane as that of the consuming device connection 6, but staggered by 90° thereto, a return flow connection 7 of a return flow channel R (FIG. 1b) opens out into the valve hole. On diametrically opposite sides of the piston slide-valve 4 two flow pockets 8, extending in the longitudinal direction, are formed, connected together through the piston slide-valve via two through holes 9. The pocket 8 facing the intake opening is, in any position A, B or N of the valve, facing the intake opening 5, so that the pressure medium present can always enter the through holes 9 to pass through them also into the diametrically opposite pocket 8. Along a further radial plane, staggered relative to the radial plane of the return flow connection 7 and the connection 6 with the consumer device, a channel 10 extending in the circumferential direction is formed in the piston slide-valve 4. As FIG. 1b shows, this may be both a circular groove 10 extending over at least 90° and an (indicated by a dashed line) angular through channel 10a, or also a circular annular groove 15 (also indicated by means of a dashed line). 11 denotes a circular (disc) section of the piston slide-valve 4 which provides for a sealing between the consuming device connection 6 and the return flow connection 7 on the one hand, and at the same time between the two connections and the channel 10, in particular in the neutral position N of the piston slide-valve 4 shown in FIG. 1. The displacement of the piston slide-valve 4 is effected by means of a valve rod 12 which is connected with a lever 13 on a bearing 14. As a result of the movement of the lever 13 shown by means of the double arrow the piston slide-valve 4 is displaced out of the neutral position indicated by N either into the first control position A or into the second control position B. The lever 13 prevents at the same time a relative rotation of the piston slide-valve 4 in the valve hole 3.

In the neutral position N according to FIG. 1 the pressure medium coming from the pump connection P is present in the pockets 8 and the through holes 9. As soon as the piston slide-valve 4 comes, as a result of the swivelling of the lever, into the position A, in the first control position, flowing medium is led via the right-hand side pocket 8 in the drawing into the consuming device connection 6 to the consuming device. The return flow connection 7 is in this position sealed by the circumference of the piston slide-valve. When the lever 13 is pivoted into the second control position B there is effected in the first instance the cutting-off of the passage from the right-hand pocket 8 in the drawing to the consuming device connection; subsequently, the channel 10 effects a throughflow connection from the consuming device connection 6 to the return flow connection 7, so that the pressure medium can flow out of the consuming device. For the sealing of the valve hole 3 to the outside provision is made in the second control position by the piston slide-valve 4 itself. As the return flow connection 7 and the consuming device connection 6 lie along the same radial plane as the piston slide-valve 4, the housing may be constructed short in the direction of the longitudinal axis of the valve hole. The return flow channel led as a straight boring to the external side of the housing is connected with the return flow connection 7.

Figure 3:
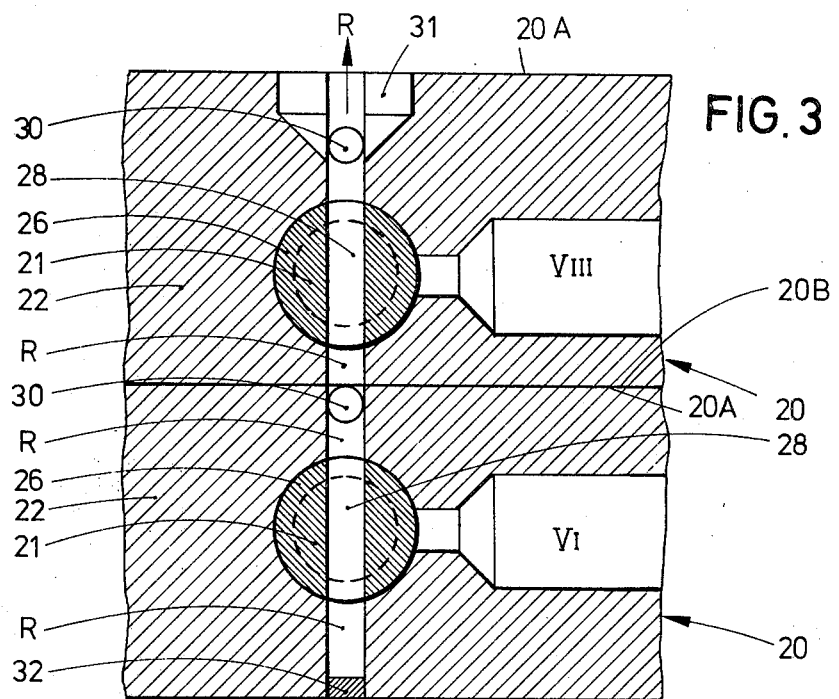
FIG. 3 is a radial section through two control valves disposed in series in an embodiment according to FIG. 2, and FIGS. 4 to 7 are various housing constructions in cross-section.
Figure 2:
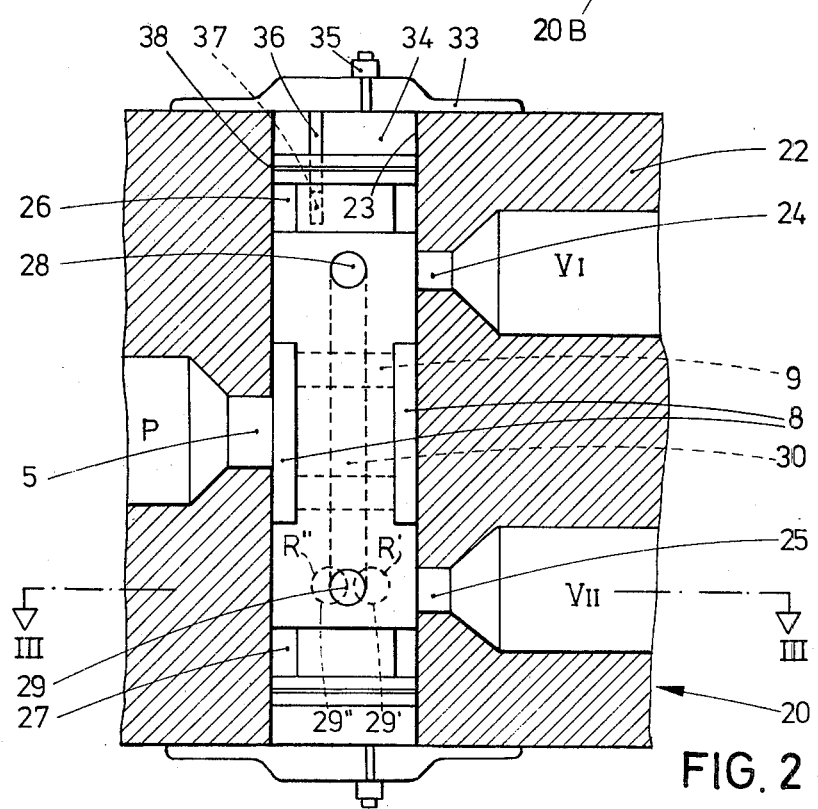
FIG. 2 is an axial section through an embodiment of a servo-controlled control valve for two consuming units acted upon alternately.

Control valves according to FIGS. 2 and 3 can be disposed in a row with their side surfaces placed one against the other. In this arrangement there is achieved a particularly simple return flow channel system without tap lines or perforations complicated to produce.

Each of the control valves 20 has a housing 22 with a valve hole 23 in which a piston slide-valve 21 can again be moved out of a neutral position into a first and a second control position. Symmetrically on both sides of the intake opening 5, but diametrically opposite the latter respective to the valve hole 23, consuming device connections 24 and 25 for consuming devices VI and VII are disposed. There may be described as consuming devices in this case the two cylinder chambers of a double-operating hydraulic cylinder with pistons which can be impinged on two sides. In such a hydraulic cylinder one cylinder chamber is to be emptied when the other is acted upon by pressure medium.

Associated with the consuming device connections 24, 25, in the same radial plane, but staggered by 90°, is a return flow channel R (FIG. 3) which passes through the housing 22 from one side surface to the other side surface. The two return flow channels R of each housing 22 are joined together by means of a connecting channel 30. The piston slide-valve 21 has, to simplify the return flow channel system, two radial bores 28 and 29 which, in the neutral position of the piston slide-valve, are in alignment with the return flow channels R and then permit the passing through of pressure medium. When the piston slide-valve 21 is moved from the neutral position N into one of the two control positions, one of the two annular grooves 26 or 27 produces on the one hand a connection between the relevant consuming device connection 24 or 25 and the relevant return flow channel R, and produces on the other hand the passage for the pressure medium between the return flow channel sections R provided under and above the valve hole 23. This assumes special importance when the control valves, as shown in FIG. 3, are disposed one after the other in a row. Independently of the fact as to which valve position has been assumed in each individual control valve, it is necessary to connect only the last control valve housing along the line to the return flow duct, as the return flow channels of all control valves are in pressure-medium-throughflow-connection with one another. In this last control valve housing a return flow duct connection 31 is then appropriately formed. The outlets of the return flow channels R not required are usually sealed by means of stoppers 32.

Naturally it is possible to arrange a safety valve on the side opposite the intake, which valve comes into operation on a pressure impact from the consuming device connection directly connected with one of the pockets 8. The piston slide-valve 21, in the embodiment according to FIGS. 2 and 3 is not pushed into its control positions by means of a valve rod, but by means of a pressure medium servo-control. For the purpose the ends of the valve 23 are closed by covers 33 so that enclosed cylinder chambers are created into which a pressure medium, which displaces the piston slide-valve 21 can be supplied alternately through connections 35. At least one cover 33 bears a pin 35 which enters the valve hole 23 and which engages into an axial hole 37 of the piston slide-valve 21. The pin 36 is disposed eccentrically to the longitudinal axis of the hole and in this manner secures the piston slide-valve against a relative rotation in the valve hole 23. The ends of the piston slide-valve 21 carry sealing rings 38. As represented by a dashed line in the bottom portion of FIG. 2, the radial holes 29 (28) and the return flow channels R can be disposed in each instance in pairs in a narrow axial area of the piston slide-valve 21 (20', 29"; R', R"). Thereby, for the same axial demand on space, it is possible to achieve a greater width of passage than with only one hole, or, in the case of reduced axial space requirement, it is possible to obtain the same passage with pairs of holes of smaller individual diameters as with only single hole.

In FIGS. 4 to 7 various embodiments of housings 20 to 20"" are represented, being differentiated from one another particularly by the conformation of the return flow channel system.

Figure 4:
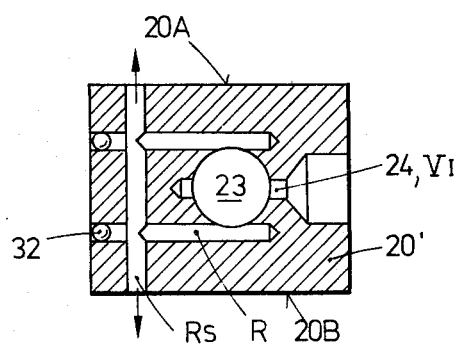

In FIG. 4 provision is made in one housing 20' for a pair of return flow channels R at the level of, and parallel with the consuming device connection 24, $V_J$, which channels on diametrically opposite sides open out approximately tangentially into the valve hole 23. The return flow channels R are formed as blind holes and are sectioned by a return flow collector channel $R_S$ extending right through the housing 20' from its external side 20A to the opposite external side 20B. The return flow collector channel $R_S$ runs approximately parallel with the upper or lower side of the housing 20'. The outlets not required of the return flow channels R are closed by means of stoppers or pressed-in balls.

Figure 5:
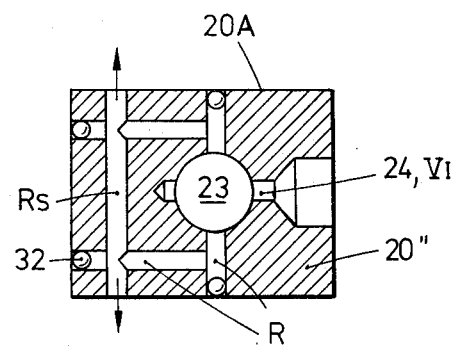

A housing 20" according to FIG. 5 has two return flow channels R which are drilled in the same way as was shown in FIG. 3. A number of return flow channels extending vertically thereto and formed as tapholes are connected from the housing side opposite the consuming device connection 24 to the above-mentioned return flow channels, and are closed at the ends not required by stoppers or balls 32. These tapholes are connected—exactly as in FIG. 4—by a through return flow collector channel $R_S$.

Figure 6:
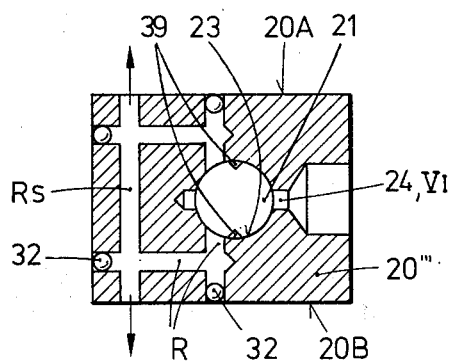

In FIG. 6 a return flow channel is led in a housing 20'''—in each case starting from a housing external side 20A, or 20B—as far as the valve hole 23. These two return flow channels R aligned on each other open out into the valve hole 23, but below its centre. From the external side of the housing opposite the consuming device connection there are provided, perpendicularly to it, two further return flow channels formed as tapholes which connect the first return flow channels with a return flow collector channel $R_S$ provided staggered respective to the valve hole 23. The piston slide-valve 21 shown in hatched lines is provided in per se known manner with guide notches 39; they form part of a per se known pressure-less circulation system, not shown, for the pressure medium, with which, in the neutral position of the valve, its general pressure release is achieved. With the guide notches 39, an accumulation of pressure in sudden bursts on the displacement of the piston slide-valve is avoided, as by these notches the flow of pressure medium is only gradually interrupted. In order not to require any increased distances between the pump intake and the openings into the return flow channel system, in spite of the guide notches provided, the return flow channels were provided under the centre of the valve hole 23.

Although then the guide notches 39 and the openings to the return flow channels R overlap in the longitudinal directin of the valve, no flow connection is established there.

Figure 7:
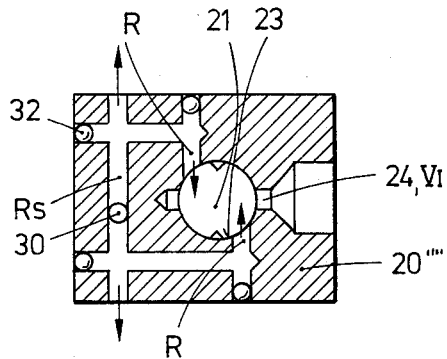

In FIG. 7 a solution involving a housing 20"" is shown, comparable with the embodiment according to FIG. 6. The two return flow channels R opening out from the sides of the housing into the valve hole 23 are disposed staggered respective to each other and also to the central axial line of the valve hole 23 and are connected via tapholes with the rear flow collector channel $R_S$. 30 denotes the cross-channel which connects the return flow system of the consuming device connection 24 with the return flow channel system of the consuming device connection 25. With this solution there is achieved that, in addition to a cerain equalization of pressure for the piston slide-valve 21, the pressure prevailing in the return flow channel system impinges symmetrically on both sides on the piston slide-valve.

With the solutions according to FIGS. 4 to 7 several control valves may be disposed in the manner of a battery with their sides surfaces 20A, 20B alongside each other, when the return flow collector channels of all housings are then in alignment.

I claim:
1. A control valve for a pressure medium system, particularly a high pressure hydraulic system, with a housing through which a valve hole passes, and with a piston slide-valve displaceable from a neutral position into two control positions, with an intake opening to the valve hole connected with a pump connection, with at least one consuming device connection staggered in the longitudinal direction of the hole relative to the intake opening, and with a return flow connection associated with the consuming device connection, connected with a return flow channel, there being provided in the piston slide-valve in front of the intake opening a pocket extending in the longitudinal direction to guide the flow, which pocket, in the first control position, connects the intake opening with the consuming device connection, provision being made on the piston slide-valve for at least one sealing disc section which, in the first control position, seals off the return flow connection from the consuming device connection, and which in the second control position releases a passage from the consuming device connection to the return flow connection, characterised in that the consuming device connection (6;24,25; V) and the return flow connection (7, R) are disposed along the same radial plane—relative to the valve hole (3, 23)—though staggered at an angle relative to each other, in that in the piston slide-valve (4, 21) a channel (10, 15, 26, 27) is provided, extending in a radial plane and bridging at least the angular staggering between the consuming device connection and the return flow connection, said piston slide-valve channel being located in the neutral position (N) of the valve a distance from the consuming device connection and return flow connection which corresponds to the valve stroke from the neutral position (N) to the second control position (B), in that the sealing disc section (11) on the piston slide-valve extends in its neutral position between the return flow connection and the consuming device connection, in that the piston slide-valve (21) is secured in the valve hole against rotation and further characterized in that the consuming device connection (6) and the return flow connection (7) are staggered relative to each other by 90°, whilst the inlet or supply (5) lies in a common plane with the consumer device connection, which plane is perpendicular to the plane of the return flow connection (7).

2. A control valve according to claim 1, characterised in that the consuming device connection (6) is disposed on the side of the valve hole opposite the intake opening (5), and in that on the piston slide-valve a pair of pockets (8) diametrically oppositely placed are provided which are connected via at least one radial through hole (9) through the piston slide-valve.

3. A control valve according to claim 1 or 2, characterised in that the channel (10) is designed as a circular annular groove (15, 26, 27) in the piston slide-valve.

4. A control valve for two alternately actuated consuming devices, according to claim 1 or 2, characterised in that there are consuming device connections (24, 25, VI, VII) and return flow connections (R) symmetrically disposed on both sides of the intake opening (5).

5. A control valve arrangement with at least two control valves arranged against each other at their side surfaces, according to claim 1 or 2, of which valves each one serves for the control of at least one consuming device, characterised in that the housing (22, 41) has, passing through it, two return flow channels (R) proceeding from one side surface to the opposite side surface and opening out into the valve hole, and in that the piston slide-valve (21, 51) has in each case a radial hole (28, 29) vertically to the flowing plane and extending from the intake opening to the consuming device connection, said holes being, in the neutral position (N) of the valve in alignment with the return flow channels (R), and in that the two return flow channels (R) in the housing of each control valve are joined via a cross-channel (30).

6. A control valve according to claim 1 or 2, characterised in that there are radial holes (29', 29") in the piston slide-valve constructed in pairs and disposed side by side along a radial plane.

7. A control valve according to claim 1 or 2, characterised in that it has, passing through it, and staggered relative to the valve hole (23) at least one return flow collector channel (R$_S$) extending from one external side of the housing (20A) to the other, from which channel the return flow is led to the valve hole (23).

8. A control valve according to claim 7, characterised in that the return flow collector channel communicates with the valve hole.

* * * * *